United States Patent [19]

Bosvot

[11] Patent Number: 5,779,798

[45] Date of Patent: Jul. 14, 1998

[54] DEVICE FOR DISTRIBUTING LIQUID BY GRAVITY

[75] Inventor: Jean-Claude Bosvot, Sassenay, France

[73] Assignee: Eastman Kodak Company, Rochester, N.Y.

[21] Appl. No.: 506,746

[22] Filed: Jul. 26, 1995

[30]   Foreign Application Priority Data

Aug. 1, 1994 [FR]   France .................... 94 09733

[51]   Int. Cl.$^6$ .................... F16K 17/14; B65D 83/00
[52]   U.S. Cl. .................... 118/506; 137/67; 137/209; 222/399; 118/200; 118/209
[58]   Field of Search .................... 118/200, 207, 118/209, 210, 231, 257, 506; 222/399; 138/114, 137, 30; 137/67, 209

[56]   References Cited

U.S. PATENT DOCUMENTS 3,850,348   11/1974   Bessot et al. .................... 222/386.5
4,362,122   12/1982   Choinski .................... 118/600

FOREIGN PATENT DOCUMENTS

WO 88/06925   9/1988   WIPO.
WO 92/10786   6/1992   WIPO.

*Primary Examiner*—Donald E. Czaja
*Assistant Examiner*—Calvin Padgett
*Attorney, Agent, or Firm*—Arthur H. Rosenstein

[57]   ABSTRACT

The invention concerns a device for distributing liquid by gravity, particularly in a photographic coating process.

The device comprises: a) a rigid cylindrical outer pipe; an inner casing produced from a flexible material and the external diameter of which is less than or equal to the internal diameter of the pipe, said casing being arranged so as to define, with the pipe, substantially concentric first and second zones isolated from each other, the second zone being connected to a source of fluid so as to be able, under the effect of the pressure of the fluid, to cause the relative volumes of the first and second zones to vary in order to control the flow of liquid in the first zone; and c) a source of pressurized fluid connected to the second zone.

12 Claims, 6 Drawing Sheets

DEVICE FOR DISTRIBUTING LIQUID BY GRAVITY

FIELD OF THE INVENTION

The invention concerns a device for distributing liquid by gravity. Such a device can be used in particular for feeding photographic emulsion to a station for coating a photosensitive surface. Other applications, however, may be envisaged.

BACKGROUND OF THE INVENTION

Traditionally, feeding photographic emulsion to systems for coating surfaces particularly photosensitive surfaces, is effected by gravity from tanks situated, with respect to the coating station, at sufficient height to ensure the required flow of liquid.

Such an approach presents a certain number of problems. The first one is related to the fact that, during loading, which is effected from the top downwards, the air contained in the down pipe is very difficult to evacuate. Often it is necessary to have recourse to expedients such as prior filling from the bottom (for example with water). Alternatively, the feed circuit is put under vacuum. Another problem is related to the fact that, at the end of the coating process, if it is desired to return the liquid product to its original tank, it is necessary either to drain the pipe by gravity or to use means of pumping or pushing by means of another fluid. In all cases, this entails a loss of time and material. Likewise, the system may sometimes include hydraulic components which may cause random or cyclical pressure variations. Such variations have repercussions on the evenness of the coating effected and affect the quality of the photographic product produced. Finally, in the event of stoppage (intentional or otherwise) of the photographic coating, a sedimentation phenomenon may occur in the pipe, which makes it necessary to keep the product moving, for example by creating a slight leak or by establishing recirculation.

Thus one of the objects of the present invention is to provide a device for distributing liquid by gravity which does not have the drawbacks of the systems mentioned in the above discussion.

SUMMARY OF THE INVENTION

These objects are achieved according to the present invention by means of a device for distributing liquid by gravity comprising:

a) a rigid cylindrical outer pipe;

b) an inner casing produced from a flexible material and the external diameter of which is less than or equal to the internal diameter of the pipe, the said casing being arranged so as to define, with the pipe, substantially concentric first and second zones isolated from each other, the first zone being open at both ends so as to receive, convey and distribute a liquid flowing therein by gravity, the second zone being connected to a source of fluid so as to be able, under the effect of the pressure of the fluid, to cause the relative volumes of the said first and second zones to vary in order to control the flow of liquid in the first zone; and c) a source of pressurized fluid connected to the said second zone.

According to another object of the present invention, a device is produced comprising:

a) a rigid cylindrical outer pipe;

b) an inner casing produced from a flexible material and the external diameter of which is less than or equal to the internal diameter of the pipe, the said casing being arranged so as to define, with the pipe, substantially concentric first and second zones isolated from each other, the first zone being open at both ends so as to receive, convey and distribute a liquid flowing therein by gravity, the second zone being connected to a source of fluid so as to be able, under the effect of the pressure of the fluid, to cause the relative volumes of the said first and second zones to vary in order to control the flow of liquid in the first zone; and c) a first reservoir disposed above the pipe and intended to supply the liquid to be distributed by gravity, the said first reservoir being connected to the said central zone of the pipe;

d) a second reservoir containing a liquid, the density of which is greater than the density of the liquid to be distributed, the lower part of the said second reservoir being connected to the annular zone by means of a first valve, the said reservoir being disposed at a position lower than the base of the pipe;

e) a source of gaseous fluid at variable pressure connected on the one hand to the top part of the said reservoir by means of a second valve and on the other hand to the said annular zone by means of a third valve;

f) means for closing off the bottom end of the pipe.

The invention also concerns a variable-volume pipe comprising:

a) a rigid cylindrical outer pipe;

b) an inner casing produced from a flexible material and the external diameter of which is less than or equal to the internal diameter of the pipe, the said casing being arranged so as to define, with the pipe, substantially concentric first and second zones isolated from each other, the first zone being open at both ends so as to receive, convey and distribute a liquid flowing therein by gravity, the second zone being connected to a source of fluid so as to be able, under the effect of the pressure of the fluid, to cause the relative volumes of the said first and second zones to vary in order to control the flow of liquid in the first zone.

BRIEF DESCRIPTION OF THE DRAWINGS

In the following detailed description, reference will be made to the drawing in which.

DETAILED DESCRIPTION OF THE INVENTION

Figure 1A:
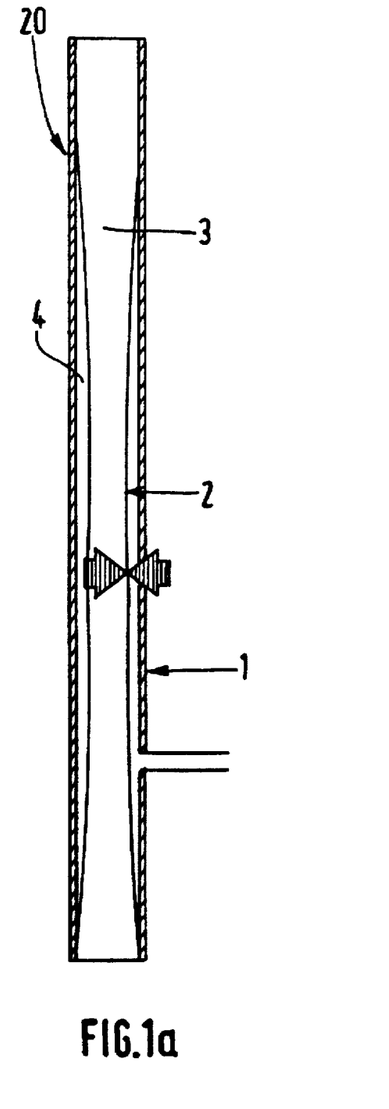
FIGS. 1a and 1b depict a first embodiment of a variable-volume pipe used in the liquid distribution device according to the invention.
Figure 1B:
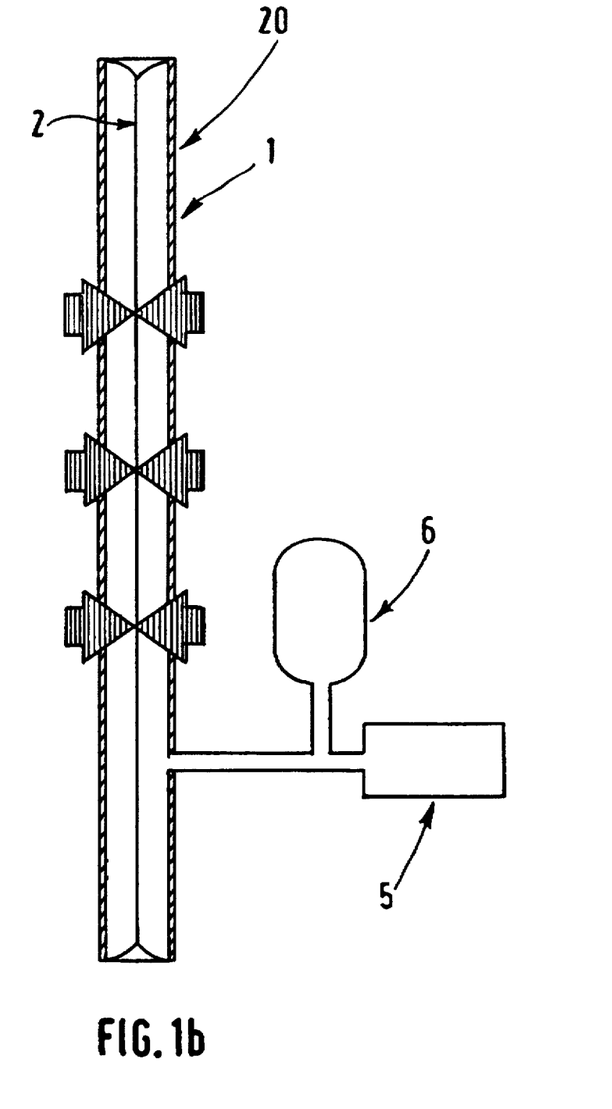

FIGS. 1a and 1b, to which reference is now made, depict schematically a variable-volume pipe as used in the liquid distribution device according to the present invention. This comprises essentially a rigid outer pipe 1, inside which is mounted a flexible pipe 2 advantageously consisting of an elastomeric material, whose external diameter at rest is less than or equal to the internal diameter of the rigid pipe. By way of example, a natural rubber such as latex is used, or synthetic elastomers based on polymers or copolymers. According to one alternative, plastomers are used, which may be molded or extruded. These plastic materials may be used alone or lined with a textile reinforcement. The flexible material is preferably chosen so that the ratio of the thickness of the material to the diameter of the pipe is less than approximately 1/20th. The flexible membrane is arranged in the pipe so as to define with the pipe two substantially concentric zones 3, 4 isolated from one another. Many techniques may be used for fitting the membrane inside the pipe. For example, the fitting may be effected by turning the ends of the flexible pipe over the external face of the rigid pipe and holding them by means of clamping collars. According to another example, the flexible pipe is gripped between a tapered bore machined at the end of the rigid pipe and a piece with a complementary shape designed to be inserted into the said end. The liquid to be distributed circulates by gravity from top to bottom.

Advantageously, it circulates in the central zone 3 of the pipe. According to the present invention, one of the zones in the pipe is connected by a conduit to a source of fluid 5 (FIG. 1b) under pressure so as to cause the relative volumes of the zones 3 and 4 to vary in order to be able to control the flow of liquid in the pipe. Advantageously, a compressed gas is injected into the annular zone 4 so as to cause the internal volume of the central zone 3 to vary. According to a variant, the liquid to be distributed circulates in the annular zone 4; a pressurized fluid is then injected into the central zone.

As illustrated in FIG. 1b, before the filling of the pipe from the top, a sufficient gas pressure is applied to the annular zone 4 for the inner pipe to be totally crushed, as depicted in FIG. 1b. This pressure must be sufficient to overcome the natural elasticity of the membrane 2 and the inherent pressure of the liquid. The internal volume of the central zone is practically nil. To fill the pipe, it suffices to return the annular zone to atmospheric pressure, and the liquid then occupies the volume available in the central zone 3 without any entry of air. This resolves the first problem mentioned in the above discussion.

When the flow of liquid is established, it is possible either to allow the flexible pipe to be pressed against the internal wall of the outer pipe 1, or to apply a pressure of fluid in the annular zone 4 so as to balance the mean pressure of the liquid. In this case, the elastic pipe 2 is free to deform, and fulfills the role of a damper of pressure perturbations in the liquid to be distributed. According to one advantageous technique, the diameter of the inner pipe is measured (by physical contact, or pneumatically or optically). The measured value is compared with a reference value or range. The pressure of the fluid sent into the annular zone 4 is modified so as to cancel out any difference between the measured value and the reference value or range. In fact any pneumatic regulation method 56 may be suitable. This does not constitute the object of the invention and consequently does not require any additional detailed description.

Advantageously again, and as depicted in FIG. 1b, the damping is improved by introducing, between the pressurized fluid source 5 and the annular zone 4, a buffer reservoir 6, the volume of which is very much greater than the volume of the annular space (for example 100 times greater). In fact, according to Mariotte's law, the relative variations in pressure are inversely proportional to the relative variations in volume ($dV/V+dP/P=0$). If $dV/V$ is small, $dP/P$ is also small. This deals very simply and effectively with the problem of random or cyclical pressure variations.

Figure 2A:
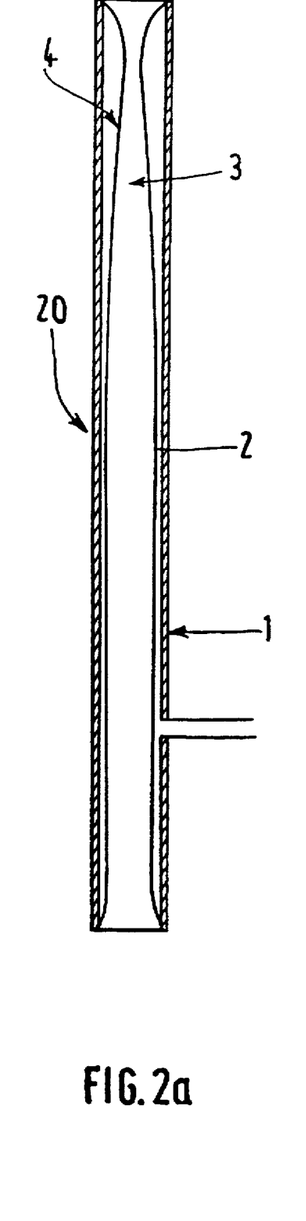
FIGS. 2a and 2b illustrate schematically a pressure profile in a variable-volume pipe such as the one depicted in FIG. 1.
Figure 2B:
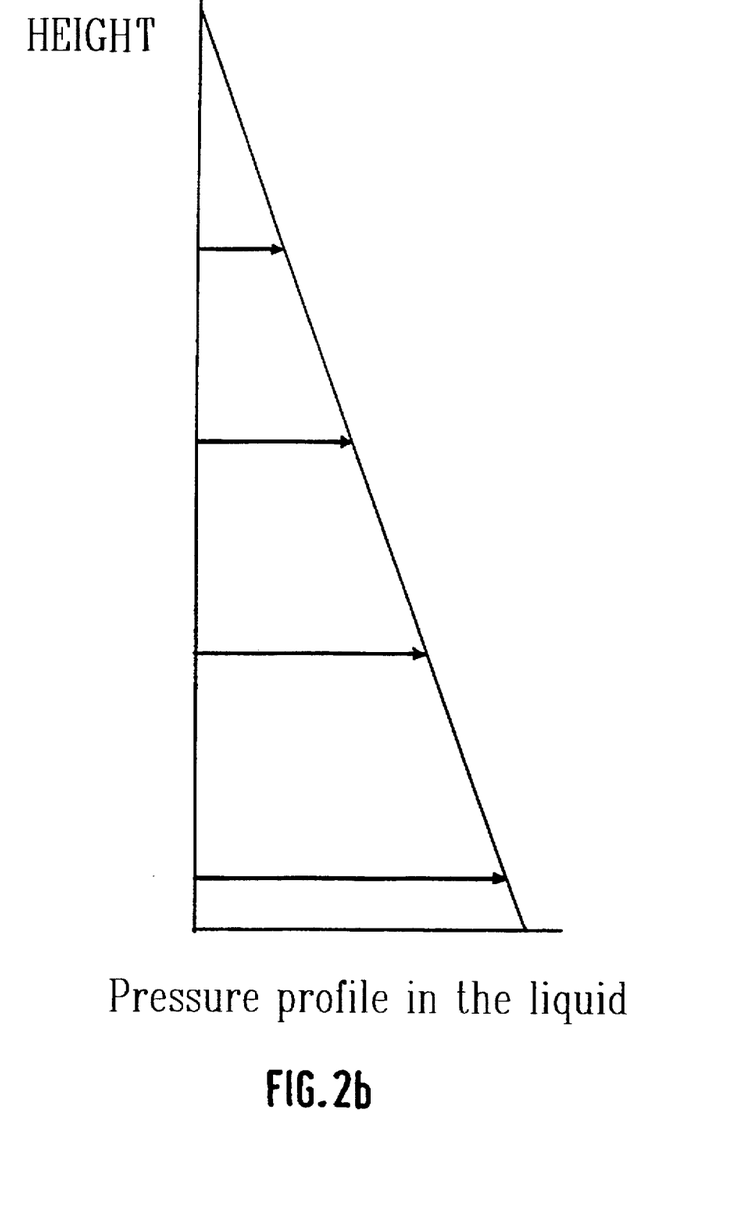
Figure 3A:
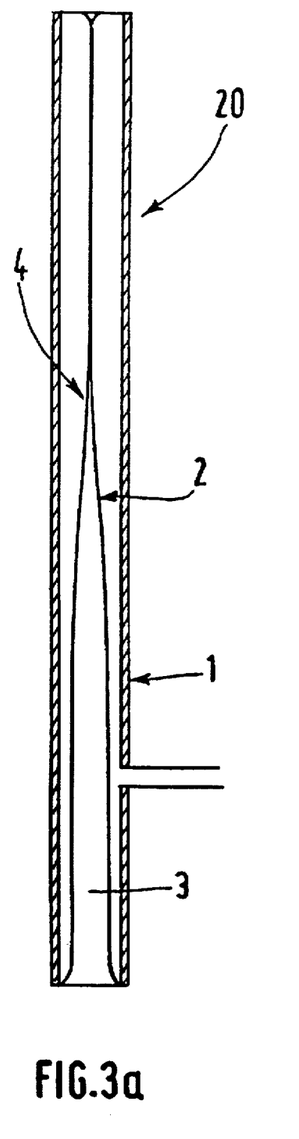
FIGS. 3a and 3b illustrate schematically the pressure profiles of the liquid in the central zone and of a regulating gas in the annular zone in a pipe such as the one depicted in FIG. 1.
Figure 3B:
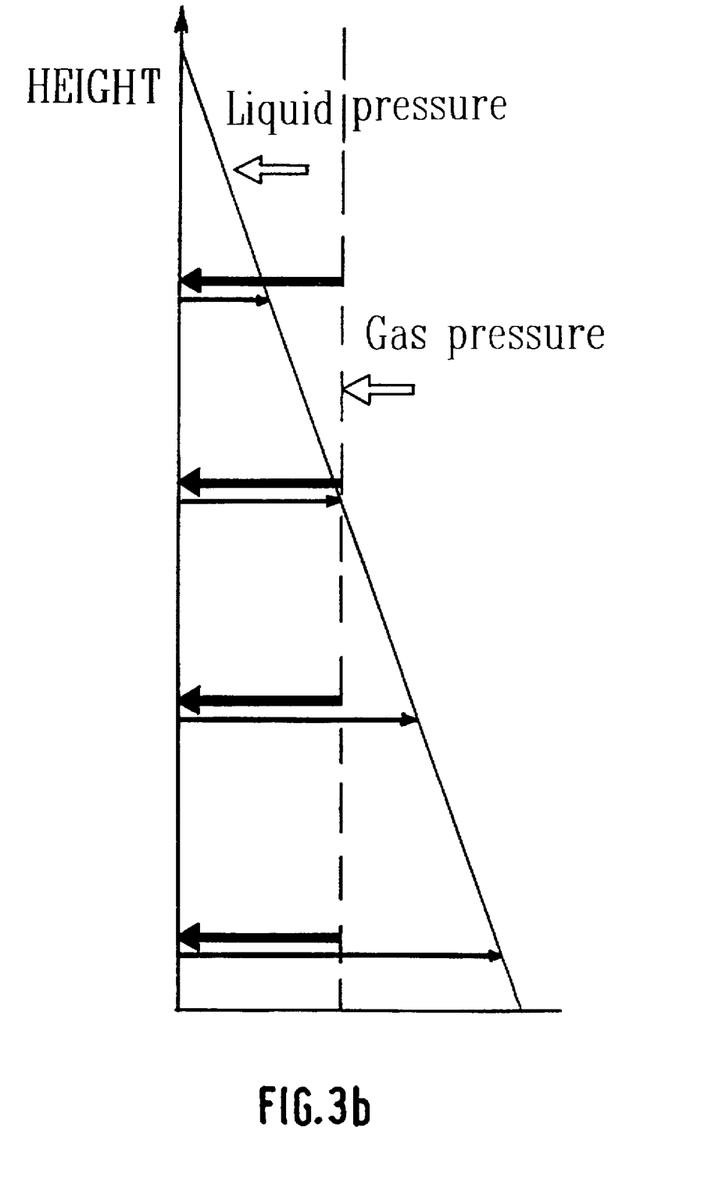

With such a variable-volume pipe, in order to empty the conduit from the bottom upwards, as may be desirable with some applications, the elastic pipe is closed off and a fluid pressure greater than the pressure of the liquid to be distributed at the base of the pipe is applied in the annular space. As depicted in FIG. 1b, the central area is crushed and then drives the liquid upwards. Account must however be taken of the fact that the pressure in the liquid is not constant (FIG. 2b) but varies proportionally with its height in the pipe. In reality, and as depicted in FIG. 3a, when a pressurized fluid is sent into the annular zone 4, the pipe is first of all crushed at the top. The pressures profile (of the liquid in the central zone, and of a gas in the annular zone) is illustrated in FIG. 3b. As a result the driving upwards is hindered, or even completely prevented, if the height exceeds a certain value (typically around 2 m).

Figure 4A:
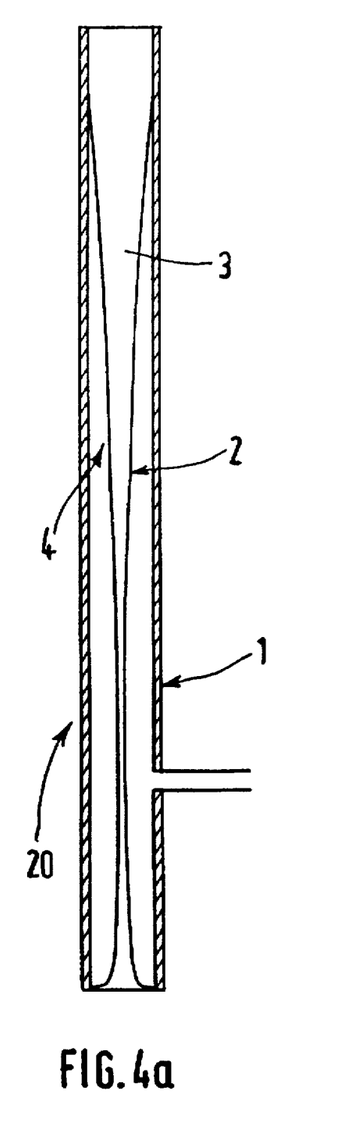
FIGS. 4a and 4b illustrate an advantageous characteristic of an embodiment of the distribution device according to the present invention.
Figure 4B:
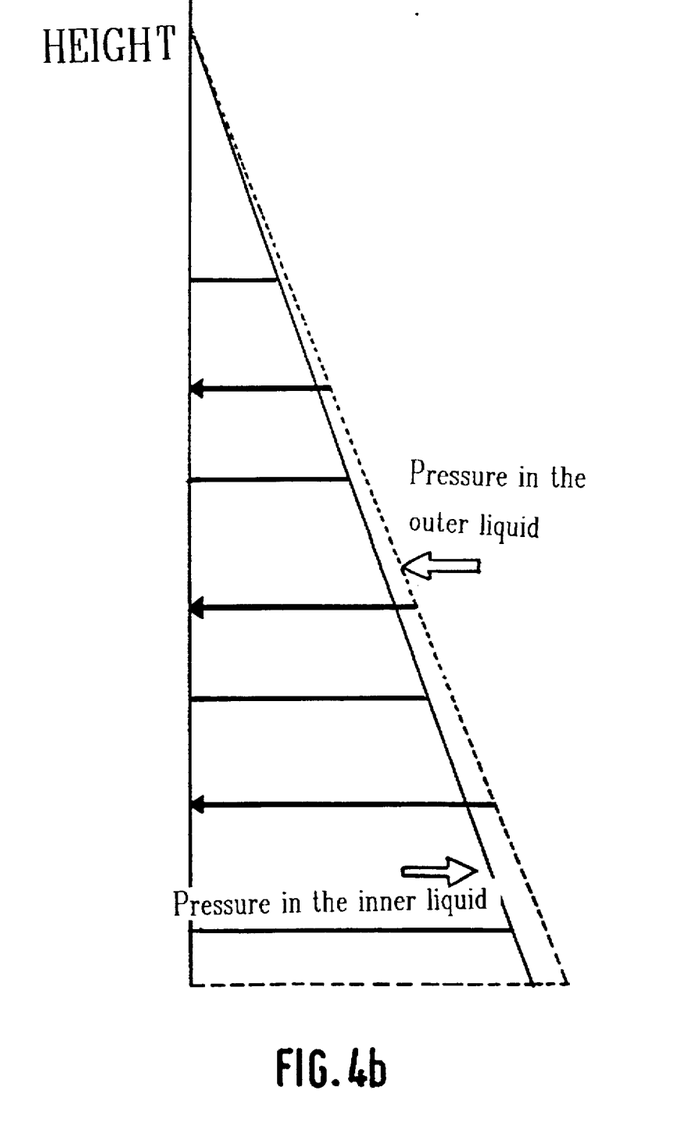

In order to avoid this phenomenon, during the drainage operation, the annular zone is connected to a source of pressurized liquid, the density of which is greater than that of the liquid contained in the central pipe 3. The differential pressure is then greater at the bottom than at the top (see FIG. 4b) and the inner pipe is crushed first of all at the bottom, which causes the liquid to be driven upwards. This is because, as is clear in FIG. 4b, the pressure exerted by the liquid in the annular zone is higher at the bottom than at the top. This difference is then sufficient to compensate for the higher pressure of the liquid to be distributed in the bottom of the central area 3.

Figure 5:
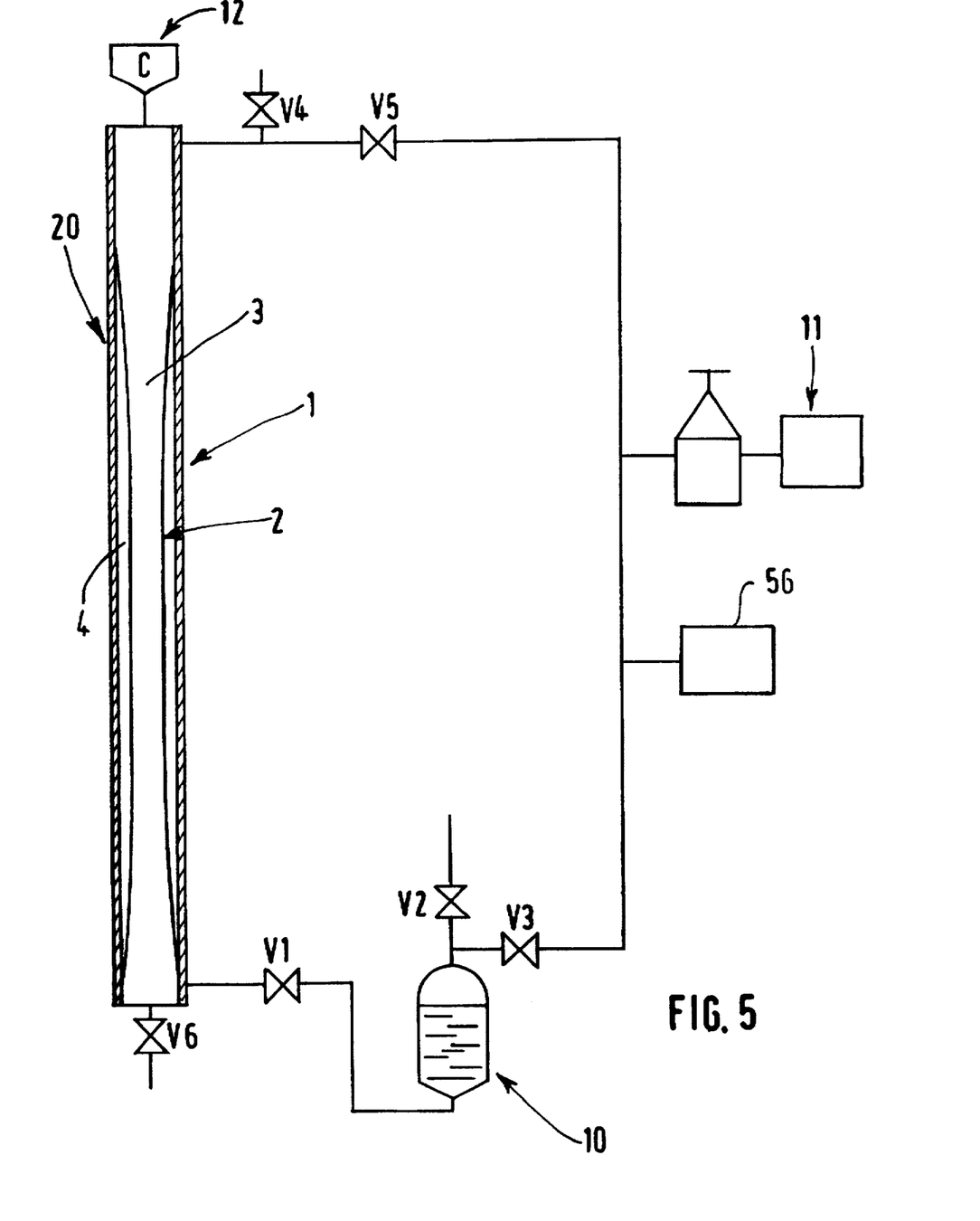
FIG. 5 depicts an embodiment of the device according to the present invention.

FIG. 5, to which reference is now made, illustrates a possible embodiment of the distribution device according to the present invention and using the advantageous characteristic mentioned above. The device comprises principally a reservoir of liquid fluid 10 (the density of which is greater than the density of the liquid flowing in the central zone 3 of the variable-volume pipe). The reservoir is connected at its bottom to the annular zone 4 by means of a valve V1. Advantageously, the reservoir 10 is situated lower than the base of the pipe 20, or in other words the maximum level of liquid in the reservoir 10 is lower than the lowest part of the pipe 20. This makes it possible to drain the device by gravity. If this condition is not fulfilled, it is necessary to make provision either for applying a pressure through the valve 5 greater than the hydrostatic pressure corresponding to the difference in level between the base of the pipe and the surface of the liquid in the reservoir 10, or for putting the reservoir 10 at atmospheric pressure by means of the valve V2. The reservoir 10 is also connected at its top to a source of pressurized gas 11 at a variable pressure (for example air) by means of a valve V3. Advantageously, the reservoir can be put at atmospheric pressure by means of a valve V2. The source of pressurized gas 11 is also connected to the annular zone 4 by means of a valve V5. The annular zone 4 can also be put at atmospheric pressure by means, for example, of a valve V4. The liquid to be distributed is contained in a reservoir 12 placed above the pipe 20 and communicating with its central part 3. A shut-off valve V6 is disposed at the outlet from the pipe 20.

In operation, the gas pressure is set at a value higher than the hydrostatic pressure of the liquid in the central pipe 3, at the base of the pipe 20, when the latter is filled, increased by the pressure required to overcome the resistance of the pipe to crushing. The valves V1, V2, V3 and V4 are closed. The valve V5 is open. The elastic pipe 2 is crushed (as in FIG.

1b). The valve V6 is then closed. The liquid contained in the tank 12 can then flow into the central area 3 of the pipe 20. For this purpose, it suffices to close V5 and open V4. The elastic membrane resumes its natural shape under the effect of the thrust of the product. If the annular zone is maintained at atmospheric pressure, the inner pipe then occupies all the available volume in the pipe 20.

In continuous operation, the base of the pipe is open (valve V6), and the product flows out. As mentioned above, if the valve V4 is maintained in the open position, the pressure of the product inside the elastic membrane presses the said membrane against the walls of the outer pipe. This avoids any risk of bursting.

If it is desired to damp any pressure pulsations, the bottom part of the pipe 20 will be connected to a regulating element of short length (typically 1 to 2 m) like the one shown in FIG. 1b. With a short length, the problems related to the hydrostatic pressure difference become insignificant.

When the device is drained, the valve V6 is closed. The valve V4 is open; the valve V2 is closed. The valves V1 and then V3 are opened. The gas pressure in the annular zone drives the liquid from the reservoir 10 towards the annular space 4. When the liquid reaches the top of the pipe, the valve V4 is closed and all the pressure is then exerted on the elastic pipe until it is completely crushed, progressively from the bottom of the pipe. The liquid in the central zone 3 of the pipe 20 is now entirely driven into the feed tank 12, which can be disconnected. Advantageously, a valve can be provided between the tank 12 and the pipe 20. The valve V5 is then opened. Since the air pressures are equal at the outlet from V5 and in the reservoir, the regulating liquid flows down from the annular zone 4 until it is completely discharged by gravity into the reservoir 10, the central pipe remaining crushed under the effect of the air pressure (V4 closed; V5 open). V1 is then closed again.

The same sequence can be used to drive the product into the tank 12 during a prolonged shut-down in order to avoid the settlement phenomena mentioned in the first part of the description.

The advantages of the present invention make it particularly suited to the feeding of a station for coating a photosensitive surface because of the importance of having a flow which is as even as possible for this type of application. Typically, one or more of these pipes connected in series directly feed the photographic coating station at which an appropriate support receives one or more layers of photographic emulsion.

Figure 6:
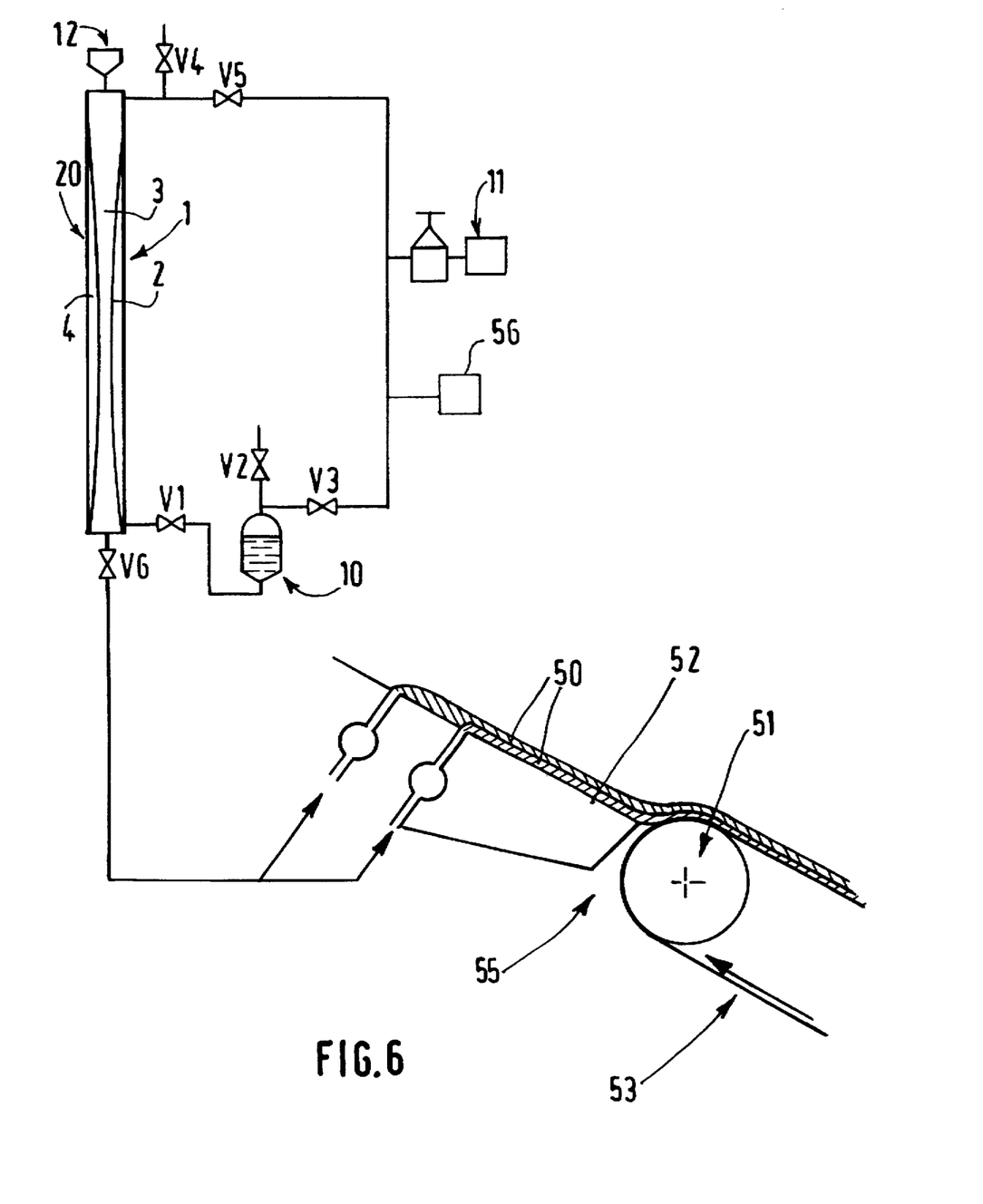
FIG. 6 depicts schematically an embodiment of a photographic coating device using emulsion feed means in accordance with those depicted in FIG. 5.

FIG. 6, to which reference is now made, depicts schematically the photographic coating device using feed means as depicted in FIG. 5. The coating station in itself has been the subject of many publications in patent literature and consequently does not require any detailed description. It should be noted however that FIG. 6 uses a coating station 55 in which one or more layers of photosensitive products 50 are deposited on a support 53 driven on a cylinder 51 disposed in the vicinity of a flow surface 52, on which the photosensitive composition flows by gravity before being deposited on the film. It is obvious that other well known coating techniques may be used.(e.g. curtain coating). As depicted in FIG. 6, the coating station is fed by gravity, using a feed device like the one detailed in FIG. 5. Any other arrangement using one or more variable-volume pipes could be used to feed the coating station 55. Such pipes may be arranged so as to form feed circuits, which may take any form. In particular, such a system allows counterslopes or siphons.

The invention has just been described with reference to preferential embodiments. It is obvious that variations may be made to these preferential embodiments without departing from the spirit of the invention.

EXAMPLES

Example 1

According to a specific embodiment, an element 2 m long was produced by means of an elastic pipe produced from natural rubber. The external diameter of the pipe at rest is 16 mm and the thickness of the elastic membrane is 0.8 mm. The rigid outer pipe has a diameter of 20 mm. This element is connected at its top to a tank filled with water situated approximately 4 m higher, which creates a hydrostatic pressure at the base of the pipe of approximately 0.6 bar. The annular space is connected either to a source of air at a pressure of 0.8 bar or to a reservoir containing a sodium bromide solution with a density of approximately 1.4.

I claim:

1. A device for distributing liquid by gravity comprising:
   a) a rigid cylindrical outer pipe having two opened ends, one of said two opened ends being an entrance end connectable to an external source of liquid and the other of said two opened ends an exit end for delivering the liquid provided by the external source of liquid;
   b) a source of pressurized fluid;
   c) a deformable casing located inside said rigid cylindrical outer pipe and being arranged so as to define, with the pipe, a first internal zone delimited by the interior of said casing and a second external zone isolated from said first internal zone delimited by said outer pipe and the exterior of said casing, one of said zones being open at said two opened ends of the rigid cylindrical outer pipe so as to receive through the entrance end the liquid to be distributed from said external source of liquid, and to convey and distribute said liquid through the exit end, by gravity the other of said zones being connected to the source of pressurized fluid to be able, under the effect of the pressure of the fluid, to cause the relative cross sections and volumes of said first and second zones to be modified, in order to control the flow rate of the liquid conveyed through said one of said zones.

2. A device according to claim 1, wherein, the zone connected to said source of pressurized fluid is the external zone.

3. A device according to claim 2, further comprising means connected to one of the ends of the external zone to close off selectively that end of said external zone.

4. A device according to claim 3, wherein said pressurized fluid is a liquid, the density of which is greater than the density of the liquid to be distributed.

5. A device according to claim 4, wherein said pressurized fluid source is connected to said external zone by of a buffer reservoir, the volume of said buffer reservoir being substantially greater than the volume of said external zone so as to absorb the relative variations in pressure of the fluid.

6. A device according to claim 5, further comprising regulating means positioned and arranged near said pipe enabling the respective cross sections of each of the zones to be maintained substantially stable during period of use.

7. A device according to claim 6, wherein said regulating means comprise:
   a) means for measuring the diameter of the central zone inside the pipe;
   b) means for calculating the difference between the measured value of the diameter and a reference value; and c) means for, according to the difference, modifying the fluid pressure so as substantially to cancel out said difference.

8. A device for distributing liquid by gravity comprising:

a) a rigid cylindrical outer pipe having two opened ends, an upper entrance end connectable to an external source of liquid and a bottom exit end for delivering the liquid provided by the external source of liquid;

b) a first reservoir disposed above the pipe and intended to supply the liquid to the entrance end to be distributed by gravity by the exit end;

c) a deformable casing located inside said rigid cylindrical outer pipe and being arranged so as to define, with the pipe, a first central and internal zone delimited by the interior of said casing and a second external and annular zone isolated from said first internal zone delimited by said outer pipe and the exterior of said casing, the first zone being open at said two opened ends of the rigid cylindrical outer pipe so as to receive through the entrance end the liquid to be distributed from said first reservoir, and to convey and distribute through the exit end said liquid flowing therein by gravity;

d) a second reservoir containing a liquid, the density of which is greater than the density of the liquid to be distributed by gravity, the lower part of said second reservoir being connected to said annular zone by a first valve so that the liquid it contains could be transferred to the annular zone;

e) a source of gaseous fluid at variable pressure connected to the top part of said second reservoir by a second valve so as to push the liquid of greater density from the second reservoir and to said annular zone, and a third valve connected near the annular zone so as to push the liquid of greater density from the annular zone towards the second reservoir to cause the relative cross sections and volumes of said first and second zones to be modified in order to control the flow rate of the liquid conveyed through said first zone;

f) means connected to the bottom exit end for closing off the bottom end of the central zone of the pipe.

9. A device according to claim 8, wherein the maximum level of liquid in the second reservoir is situated below the base of the pipe.

10. A device according to claim 9, further comprising means connected to the annular zone for selectively putting said annular zone at atmospheric pressure.

11. Use of the device according to claim 10 for feeding a station for coating a photosensitive surface.

12. A device according to claim 8, further comprising means connected to the second reservoir for selectively putting said second reservoir at atmospheric pressure.

* * * * *